United States Patent

[11] 3,591,132

| [72] | Inventors | Philip Johnston<br>Jenkintown;<br>Peter J. Hurt, Doylestown, both of, Pa. |
|---|---|---|
| [21] | Appl. No. | 824,787 |
| [22] | Filed | May 15, 1969 |
| [45] | Patented | July 6, 1971 |
| [73] | Assignee | Lehigh Fluid Power, Inc.<br>Easton, Pa. |

[54] COUPLING FITTING WITH SLIDING VALVE
11 Claims, 4 Drawing Figs.

[52] U.S. Cl. .................................................. 251/146, 251/328
[51] Int. Cl. .................................................. F16k 3/02, F16l 41/00
[50] Field of Search .................................................. 251/145, 146, 327, 328; 285/197, 198, 199

[56] References Cited
UNITED STATES PATENTS
| 48,543 | 7/1865 | Floyd .............................. | 251/145 X |
| 1,487,593 | 3/1924 | Patton ............................ | 251/146 |
| 3,000,610 | 9/1961 | Bryant ............................ | 251/327 |

FOREIGN PATENTS
| 588,474 | 5/1947 | Great Britain ................ | 285/197 |

Primary Examiner—William R. Cline
Attorney—Smythe & Moore

ABSTRACT: The pipeline fitting has two halves assembled about a main pipeline with one of the halves having an opening therethrough communicating with an opening in the pipeline. An outlet piece also has an opening aligned with the fitting opening with the opposed faces of the outlet piece and apertured fitting being flat and defining an elongated chamber within which is slidably mounted a flat slide. The flat slide is provided with an elliptical insert surrounded by an O-ring with an aperture through the insert to provide communication between the outlet piece and fitting openings in one position of the slide. The aligned openings are within the elliptical shaped O-ring during all positions of the slide.

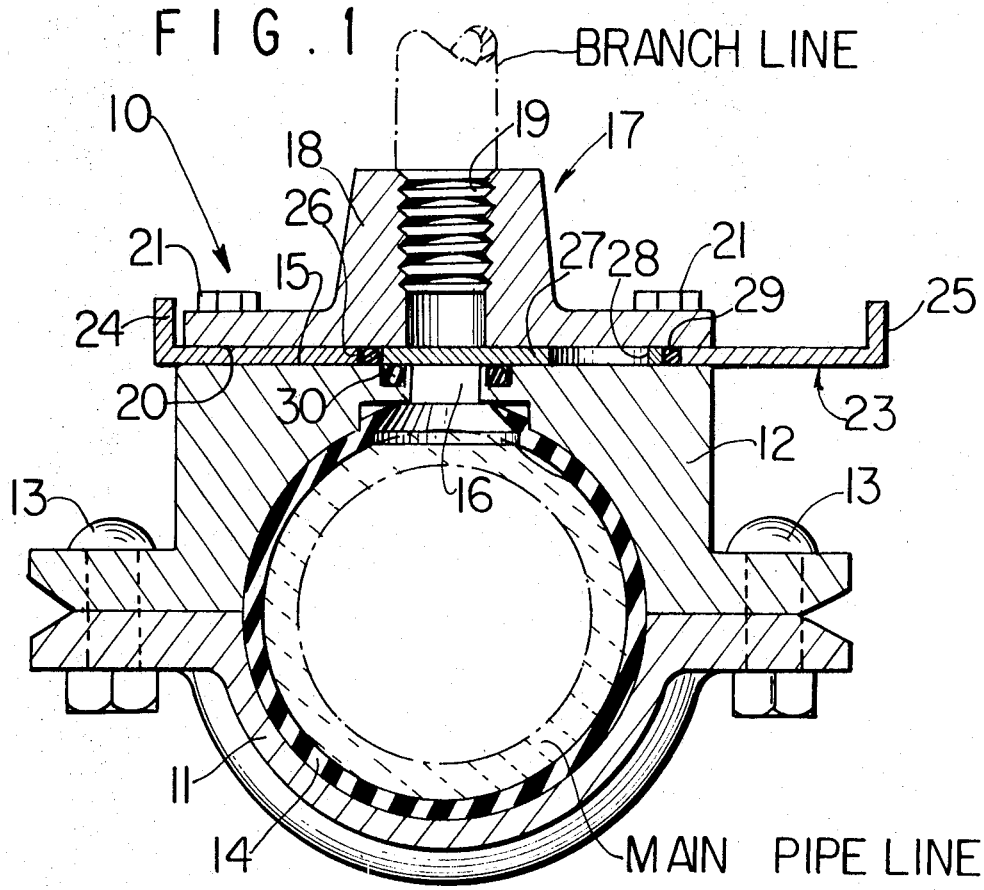
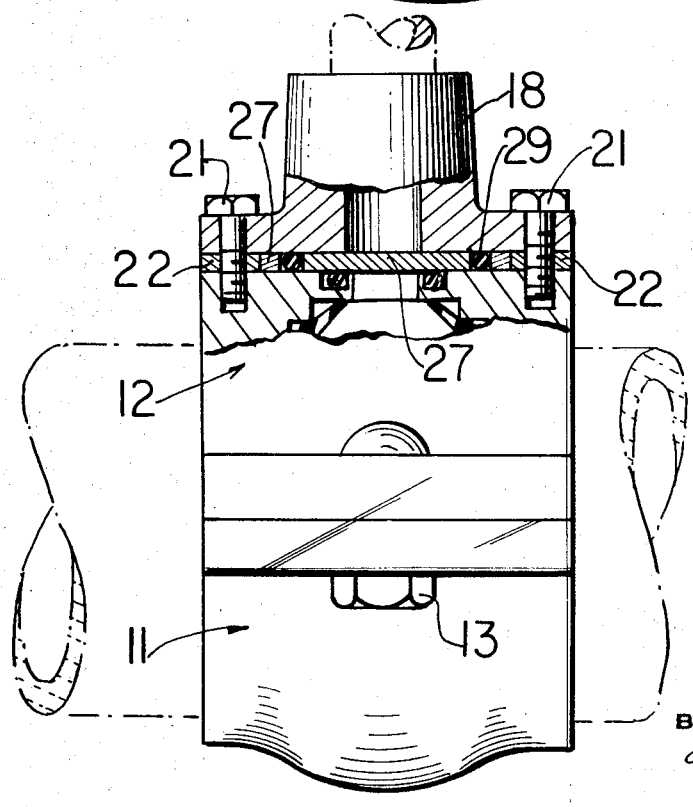

COUPLING FITTING WITH SLIDING VALVE

In many industrial operations involving the flow of fluids through pipes and other conduits, it is frequently necessary to connect a branch line onto a main line. Where it can be anticipated that a branch connection would be made to a main line, it has been the practice to connect to the main line a branch stub outlet or drop line fitting which is capped or plugged until the need for the branch line arises. In order to make a branch line connection, it is necessary to reduce the pressure in the main line or to drain the main line. Where it is anticipated that such drainage of the main line will not be convenient, the stub outlets are initially provided with separate valves which may eventually be used as a means for attaching a branch line.

It is an object of the present invention to provide an improved and inexpensive fitting for the connection of a branch line to a main line at a subsequent date.

It is another object of the present invention to provide a drop line fitting which eliminates the necessity of draining the main line and the installation of a separate valve on the outlet.

It is a further object of the present invention to provide a drop line fitting having an improved slide valve structure.

In one aspect of the present invention, there may be provided a drop line fitting for connecting a branch line to a main line which comprises a clamping half for mounting upon the main line. A connecting half having an opening therethrough is also mounted upon the main line opposed from the clamping half with the opening being aligned with an opening in the main line. The assembled halves are then suitably interconnected. The connecting half has a substantially flat surface surrounding one end of its opening. An outlet piece having a similar flat surface is attached to the connecting half so that the respective flat surfaces are slightly spaced from each other. An apertured slide is movably mounted between the opposed flat surfaces to open and close the openings. The slide is provided with an insert having an aperture therethrough with an O-ring surrounding the insert. The aligned openings in the fitting are confined to the outline of the insert and O-ring during all positions of the slide.

Other objects, advantages and features of the present invention will be apparent from the accompanying description and drawings, which are merely exemplary.

In the drawings:

FIG. 1 is a transverse sectional view taken through a main line pipe and a fitting, according to the present invention, mounted thereon;

FIG. 2 is a side elevational view of the fitting shown in FIG. 1 with a portion thereof being shown in section;

Proceeding next to the drawings wherein like reference symbols indicate the same parts throughout the various views, a specific embodiment of the present invention will be described in detail.

Figure 3:
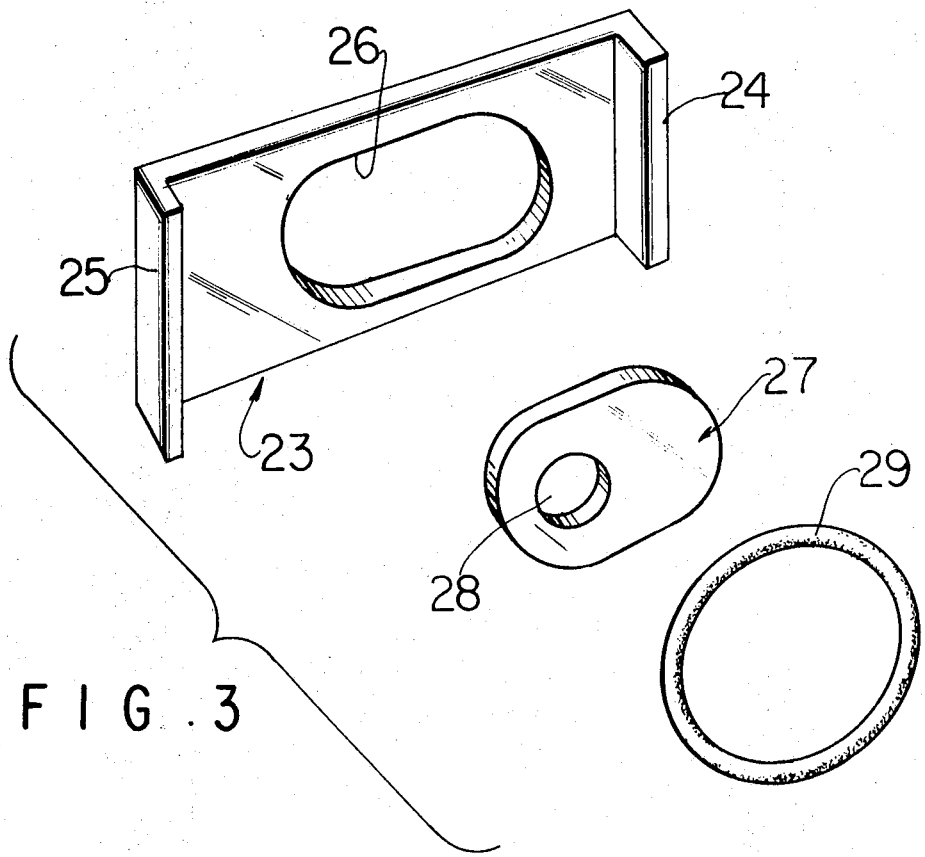
FIG. 3 is an exploded perspective view of the slide valve member and components of the fitting of FIGS. 1 and 2.
Figure 4:
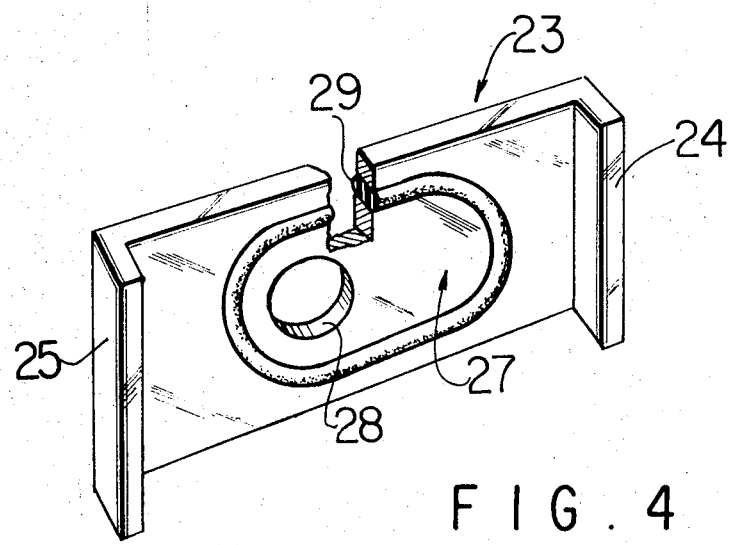
FIG. 4 is an overall perspective view of the assembled slide.

In FIG. 1, there is indicated generally at 10 a drop line fitting comprising a semicircular clamping half 11 and a mating semicircular connection half 12 which are assembled around a main pipeline in the relative positions seen in FIG. 1. The halves are connected by bolts 13 passing through respective external flanges of the halves. In the inner portion of the assembled halves, there may be provided a pipe gasket 14 to ensure a tight seal with the pipe.

The connecting half 12 is provided with a flat upper surface 15 and an opening 16 which is substantially at right angles to the flat surface. The opening 16 is aligned with a corresponding opening or situs of a potential opening in the main pipeline.

An outlet piece 17, having an external boss 18 through which is provided a bore 19, has on its underside a flat surface 20. The outlet piece 17 is attached to the connecting half by a number of bolts 21 around which are positioned spacers 22 to determine the distance between the opposed flat surfaces 15 and 20 of the connecting half and outlet piece respectively. As a result of this assembly, there is defined a relatively flat thin elongated chamber between the outlet piece 17 and connecting half 12.

A main slide 23 is slidably mounted between the opposed flat surfaces and the spacers 22. The ends of the slide are upturned at 24 and 25 and these upturned ends provide handles for manipulating the slide and also stops for limiting the movement of the slide.

As may be best seen in FIG. 3, the slide is provided with a substantially elliptical opening 26 within which is positioned an insert 27 having an aperture 28 therethrough. An O-ring is interposed between the insert 27 and the opening 26 and is selected so as to project slightly above the surfaces of the main slide and thus to engage the flat surfaces 15 and 20. This O-ring 29, when mounted in the main slide, thus constitutes a sliding seal.

The size of the insert is such that the connecting half opening 16 is always contained within the outline of the O-ring 29. The opening 28 in the main slide is at one end of the insert so that when the slide is in the closed position as shown in FIG. 1, the opening 16 is within the outline of the O-ring 29. Similarly, when the main slide is moved to an extreme position toward the left so that the opening 28 is aligned with the opening 16, the opening 16 is again confined within the outline of the sliding seal 29.

A stationary seal in the form of an O-ring 30 may be provided, surrounding the opening 16 in the connecting half. The stationary or static seal will engage the undersurface of the main slide 23.

While not shown in the drawing, a similarly constructed static seal may be provided in the outlet pieces surrounding the bore 19 and engaging the upper surface of the main slide 23.

When the assembly is in the closed position, as shown in FIG. 1, the solid portion of the insert 27 completely covers the outlet opening 16 in the connecting half. The static seal 30 with the solid insert portion bearing on it, thus completely shuts off any flow from the main pipeline.

When the slide is moved to its other extreme position, the solid area around the insert opening 28 will bear against the static seal 30. The fluid will then flow through the insert opening 28 and out through the outlet 19 in the outlet piece 17. No leakage will occur since the fluid is contained within the cavity surrounded by the sliding seal 29. The sliding seal is held in position in one plane by being contained in the space between insert and slide and in the other plane by the compression exerted by the connecting half and the outlet piece. Similarly, if the slide 23 is so positioned that the opening 28 in its insert only partially covers the passage through the connecting half 12 and the outlet piece 17, the fluid is contained within the confines of the sliding seal 29 and no leakage will occur along or around the slide.

It is thus apparent that as a result of this construction the slide valve is leakproof at any setting of the slide. This no-leak condition is particularly advantageous when the valve is partially opened as a throttling orifice so as to control flow volume or pressure or when the valve is being shifted from the full open to the full closed position.

The slide 23 can be provided with stops or graduations to indicate the extent of slide travel and thus the extent to which the drop line fitting valve unit is open or closed.

Thus, it can be seen that the present invention has disclosed an improved slide valve which is particularly advantageous for use in a drop line fitting. The combination of sliding and stationary seals and the slide will keep the unit leakproof at all flow settings. The insert in the main slide will press on the static seal to effectively close off any flow when such closeoff is desired. The sliding seal positioned between the insert and main slide utilizes both its upper and lower surfaces to seal with one side bearing against the connecting half and the other side bearing against the outlet piece. The sliding seal is positioned by the insert within the main slide. As a result of this construction, no special grooves or multiple seal arrangements are required to seal on the two surface. The elongated shape of the sliding seal permits use of a standard commercial O-ring type seal having adequate length to accommodate the relatively long travel required of the seal but with a minor axis small enough to keep the overall width of the slide and hence of the entire unit to an efficient and inexpensive shape.

It will be understood that various details of construction and arrangement of parts may be made without departing from the spirit of the invention.

What we claim:

1. A drop line fitting for connecting a branch line to a main line and comprising a clamping half for mounting upon a main pipeline, a connecting half having an opening therethrough for mounting upon the main line pipe opposed from said clamping half with said opening being aligned with an opening in the main line pipe, means for interconnecting the halves assembled around the main line pipe, said connecting half having a substantially flat surface surrounding one end of said opening therethrough, an outlet piece having a flat surface and attached to said connecting half with the respective flat surfaces being slightly spaced from each other, and an apertured slide movably mounted between said opposed flat surfaces to open and close the openings in said clamping and connecting halves, said slide having an insert therein and extending therethrough with the aperture of said slide being in said insert.

2. A drop line fitting as claimed in claim 1 and comprising an O-ring positioned around said insert and protruding above both surfaces of said slide to sealingly engage said connecting half and outlet piece flat surfaces.

3. A drop line fitting as claimed in claim 2 and comprising a stationary seal on said connecting half surrounding the opening therethrough and contacting said insert.

4. A drop line fitting as claimed in claim 2 with said insert being elliptical and the aperture being in one end thereof.

5. A drop line fitting as claimed in claim 4 with said aligned openings in the connecting half and outlet piece being within the elliptical-shaped O-ring during all positions of the slide so that fluid is contained within the O-ring seal.

6. A drop line fitting as claimed in claim 1 with said slide being transverse to the longitudinal axis of the main line pipe.

7. A slide valve comprising a valve body having a passage therethrough, means in said valve body defining a flat elongated chamber intersecting said passage at substantially right angles thereto, and an apertured slide movably mounted within said elongated passage to open and close said passage, said slide having an insert therein and extending therethrough with the aperture of said slide being in said insert.

8. A slide valve as claimed in claim 7 and comprising an O-ring positioned around said insert and protruding above both surfaces of the slide to sealingly engage the surfaces of the flat elongated chamber.

9. A slide valve as claimed in claim 8 with the valve passage being within the O-ring during all positions of the slide so that fluid is contained within the O-ring seal.

10. A slide valve as claimed in claim 7 with said insert being elliptical in shape with the aperture being near one end thereof.

11. A slide valve as claimed in claim 7 and comprising a stationary seal surrounding said passage on at least one side of said slide and sealingly engageable therewith.